US012584256B2

(12) United States Patent (10) Patent No.: US 12,584,256 B2
Matsuda et al. (45) Date of Patent: *Mar. 24, 2026

(54) PRINTED NAPPED SHEET AND NAPPED SHEET FOR PRINTING

(71) Applicant: KURARAY CO., LTD., Okayama (JP)

(72) Inventors: Daisuke Matsuda, Okayama (JP); Masashi Meguro, Okayama (JP); Michinori Fujisawa, Okayama (JP)

(73) Assignee: KURARAY CO., LTD., Okayama (JP)

( * ) Notice: Subject to any disclaimer, the term of this patent is extended or adjusted under 35 U.S.C. 154(b) by 706 days.

This patent is subject to a terminal disclaimer.

(21) Appl. No.: 16/768,967

(22) PCT Filed: Nov. 14, 2018

(86) PCT No.: PCT/JP2018/042134
§ 371 (c)(1),
(2) Date: Jun. 2, 2020

(87) PCT Pub. No.: WO2019/116812
PCT Pub. Date: Jun. 20, 2019

(65) Prior Publication Data
US 2021/0115610 A1 Apr. 22, 2021

(30) Foreign Application Priority Data
Dec. 13, 2017 (JP) ................................. 2017-238458

(51) Int. Cl.
| *D06C 23/02* | (2006.01) |
| *B32B 7/09* | (2019.01) |
| *D01F 8/14* | (2006.01) |
| *D06N 3/00* | (2006.01) |
| *D06N 3/14* | (2006.01) |

(52) U.S. Cl.
CPC ................ *D06C 23/02* (2013.01); *B32B 7/09* (2019.01); *D01F 8/14* (2013.01); *D06N 3/0036* (2013.01); *D06N 3/14* (2013.01); *B32B 2250/05* (2013.01); *B32B 2250/20* (2013.01); *B32B 2262/0238* (2013.01); *B32B 2262/0284* (2013.01); *D06N 2209/067* (2013.01)

(58) Field of Classification Search
CPC ...... D06C 23/02; D06C 11/00; D06N 3/0004; D06N 3/0075; D06N 3/004
See application file for complete search history.

(56) References Cited

U.S. PATENT DOCUMENTS

| 6,159,581 A | 12/2000 | Yoneda et al. |
| 2004/0157037 A1* | 8/2004 | Yamaguchi ............. B32B 5/022 442/361 |
| 2008/0102245 A1* | 5/2008 | Mimura ................... D06N 3/14 428/88 |
| 2017/0183815 A1 | 6/2017 | Kuroda et al. |
| 2019/0127908 A1 | 5/2019 | Meguro |

FOREIGN PATENT DOCUMENTS

| JP | H5-51877 A | 3/1993 |
| JP | 2002371478 A | 12/2002 |
| JP | 2008057062 A | 3/2008 |
| JP | 2017106127 A | 6/2017 |
| JP | 2017133114 A | 8/2017 |
| WO | WO-2015151872 A1 | 10/2015 |
| WO | WO-2017221961 A1 | 12/2017 |

OTHER PUBLICATIONS

Extended European Search Report issued Oct. 18, 2021 in Patent Application No. 18889656.7, 8 pages.
International Search Report issued Feb. 5, 2019 in PCT/JP2018/042134 (with English translation).

* cited by examiner

*Primary Examiner* — Jenna N Chandhok
(74) *Attorney, Agent, or Firm* — Element IP, PLC

(57) ABSTRACT
Disclosed is a printed napped sheet or a printing sheet including a fabric having a napped surface, wherein the napped surface is printed and has, as measured by a surface roughness measurement in accordance with ISO 25178, an arithmetic mean height (Sa) of a predetermined value or less (e.g., 30 μm or less) in both a grain direction and a reverse grain direction, and the napped surface has a density of peaks (Spd), having a height of 100 μm or more from a mean height, of a predetermined value or less (e.g., $30/432$ mm$^2$ or less) in both the grain direction and the reverse grain direction. Also disclosed is a printed napped sheet wherein the napped surface has a difference (absolute value) in density of peaks (Spd), between the grain direction and the reverse grain direction, of $20/432$ mm$^2$ or less.

9 Claims, No Drawings

PRINTED NAPPED SHEET AND NAPPED SHEET FOR PRINTING

TECHNICAL FIELD

The present invention relates to a printed napped sheet that has, on a surface thereof, a design provided by printing, and that can be used as a surface material for clothing, shoes, articles of furniture, car seats, general merchandise, and the like, and a printing napped sheet for producing the same.

BACKGROUND ART

Conventionally, napped sheets, such as a suede-like artificial leather and a nubuck-like artificial leather, that have a napped surface are known. For example, a napped sheet has a napped surface formed by napping the surface of a fabric. In use, it is often the case that such a napped sheet is dyed with a dye, colored with a pigment, or the surface of the napped sheet is printed.

For example, PTL 1 listed below discloses a nubuck-like, leather-like sheet that includes a porous layer on a fibrous substrate including ultrafine fibers, wherein the surface of the porous layer has opening portions with a diameter of 1 μm or more, and an image with a resolution of 5 dot/mm or more is formed on the surface thereof using a pigment-based ink by inkjet printing.

Meanwhile, techniques for adjusting the surface properties of a nubuck-like artificial leather, which is a napped sheet, in order to improve the appearance thereof are known. PTL 2 listed below discloses an artificial leather having a wet tactile impression like that of a natural nubuck leather and an elegant appearance with a uniform color tone. Specifically, PTL 2 discloses an artificial leather including a fiber-entangled body made of ultrafine fibers with a single fiber fineness of 0.01 dtex or more and 0.50 dtex or less, and an elastic polymer. At least one surface of the artificial leather includes napped fibers, the value of the arithmetic mean height Pa of a cross-sectional profile curve of the napped surface including napped fibers is 26 μm or more and 100 μm or less, and the value of the arithmetic mean height Pa of a cross-sectional profile curve of the other surface is 20% or more and 80% or less of the value of the surface roughness Pa of the napped surface. The existence frequency of asperity peaks of the cross-sectional profile curve of the napped surface is 1.8 or more and 20 or less per 1.0 mm, and a woven or knitted fabric is stacked on the other surface at a depth of 10% or more and 50% or less.

CITATION LIST

Patent Literatures

[PTL 1] Japanese Laid-Open Patent Publication No. 2008-057062
[PTL 2] WO 2015/151872

SUMMARY OF INVENTION

Technical Problem

In the case where a pattern is printed on the napped surface of a napped sheet, spot-like defects may be generated when the printed surface is rubbed to erect the fibers. This occurs due to the fact that the back side where the napped fibers have collapsed is shadowed during printing, and thus the ink does not sufficiently reach that side. It is an object of the present invention to provide a printed napped sheet that is less likely to generate spot-like defects in a napped sheet having a printed napped surface even if the fibers are erected.

Solution to Problem

One aspect of the present invention is directed to a printed napped sheet including a fabric having a napped surface, wherein the napped surface is printed, and has, as measured by a surface roughness measurement in accordance with ISO 25178, an arithmetic mean height (Sa) of 30 μm or less in both a grain direction and a reverse grain direction, a density of peaks (Spd) having a height of 100 μm or more from a mean height, of 30/432 mm$^2$ or less in both the grain direction and the reverse grain direction, and a difference (absolute value) in density of peaks (Spd) between the grain direction and the reverse grain direction, of 20/432 mm$^2$ or less. In a printed napped sheet having such a napped surface, fibers are less likely to be raised above a certain height from the collapsed state even if the napped surface is rubbed in any of the grain direction and the reverse grain direction. Accordingly, the portion that was shadowed and thus was not colored with an ink during printing is less likely to appear even if the printed surface is rubbed.

It is preferable that the fabric includes a first elastic polymer attached to the napped surface. By fixing the fibers on the napped surface with the first elastic polymer, the fibers are less likely to be raised above a certain height from the collapsed state, so that a napped surface with a low surface roughness can be easily formed.

It is preferable that the fabric includes a second elastic polymer applied after formation of the napped surface, because a napped surface with an even lower surface roughness can be easily formed.

It is preferable that the fabric includes fibers having an average yarn toughness of 8 to 40 cN %. In this case, the fibers will not become too hard, and, therefore, the fibers on the napped surface can be easily shortened by napping. This can suppress generation of long napped fibers that are likely to generate spot-like defects, and is therefore preferable.

It is preferable that the fabric includes polyester fibers having an average fineness of 0.01 to 0.5 dtex, and printing is performed with a disperse dye ink, because of the ease of formation of a napped surface with a low surface roughness and the excellent color development.

It is preferable that the fabric is a leather-like sheet including a third elastic polymer applied therein, because it can provide a fabric having excellent shape stability and fullness.

It is preferable that the fabric is colored with a pigment applied into internal voids thereof, because the fabric can be adjusted such that any spot generated when the fibers on the napped surface are erected can be made less conspicuous.

Another aspect of the present invention is directed to a printing napped sheet including a fabric having a napped surface, wherein the napped surface is used for printing, and has, as measured by a surface roughness measurement in accordance with ISO 25178, an arithmetic mean height (Sa) of 20 μm or less in both a grain direction and a reverse grain direction, and a density of peaks (Spd) having a height of 100 μm or more from a mean height, of 20/432 mm$^2$ or less in both the grain direction and the reverse grain direction. In the case of printing the napped surface of such a printing napped sheet, spot-like defects are less likely to be generated even if the fibers on the napped surface are erected.

Advantageous Effects of Invention

According to the present invention, spot-like defects are less likely to be generated even if the fibers on a printed napped surface are erected.

DESCRIPTION OF EMBODIMENT

A printing napped sheet and a printed napped sheet according to the present embodiment will be described in detail. The printed napped sheet of the present embodiment is a printed napped sheet including a fabric having a napped surface, wherein the napped surface is printed, and has, as measured by a surface roughness measurement in accordance with ISO 25178, an arithmetic mean height (Sa) of 30 μm or less in both a grain direction and a reverse grain direction, a density of peaks (Spd) having a height of 100 μm or more from a mean height, of 30/432 mm$^2$ or less in both the grain direction and the reverse grain direction, and a difference (absolute value) in density of peaks (Spd) between the grain direction and the reverse grain direction, of 20/432 mm$^2$ or less. In such a printed napped sheet, fibers are less likely to be raised above a certain height from the collapsed state. Such a printed napped sheet can be produced by printing the napped surface of a napped sheet (printing napped sheet) having a napped surface with a low surface roughness formed thereon.

Examples of the fabric include a non-woven fabric, a woven fabric, and a knitted fabric. As for the fineness of the fibers that form the fabric, it is preferable to use ultrafine fibers having an average fineness of preferably 0.01 to 0.5 dtex, more preferably 0.05 to 0.4 dtex, particularly preferably 0.1 to 0.35 dtex, because a dense napped surface that has a low surface roughness and is suitable for printing can be formed. Note that the average fineness is determined by imaging a cross section of the fabric that is parallel to the thickness direction thereof using a scanning electron microscope (SEM) at a magnification of 3000×, and calculating an average value of the diameters of evenly selected 15 fibers by using the densities of the resin that forms the fibers. When the average fineness is too high, the fibers on the napped surface tend to be long or to be raised. When the average fineness is too low, the color development by printing tends to be reduced.

As for the fiber length of the fibers that form the fabric, it is possible to use staples that have been intentionally cut to a predetermined length, or may use long fibers (filaments), such as continuous fibers, that have not been intentionally cut to have a predetermined length after being spun. Among these, filaments are particularly preferable in that long fibers are less likely to appear on the surface because they are less likely to be pulled out as a result of the napped surface being rubbed, and that the fibers can be easily fixed so as to be less likely to be raised from the laid-down state.

The resin for forming the fibers that form the fabric is not particularly limited, as long as the resin can form printable fibers and a napped surface with a low surface roughness. Specific examples thereof include polyesters such as polyethylene terephthalate (PET), polytrimethylene terephthalate (PTT), polybutylene terephthalate (PBT), a polyester elastic body or modified products thereof with isophthalic acid or the like; nylons such as nylon 6, nylon 66, nylon 610, nylon 12, an aromatic nylon, a semi-aromatic nylon, a polyamide elastic body or modified products thereof; polyolefins such as polypropylene; and polyurethanes such as polyester polyurethane. Among these, polyesters are preferable because a napped surface with a low surface roughness can be easily formed, and printing with excellent color development can be performed using a disperse dye ink, a cationic dye ink, or the like.

Preferably, the fabric is a leather-like sheet such as an artificial leather in which an elastic polymer (third elastic polymer) is applied, in order to provide shape stability and fullness thereto. The third elastic polymer applied in the fabric can be applied by such a method that involves impregnating the fabric before being napped with a resin solution of the elastic polymer by dip-nipping or the like, and solidifying the elastic polymer. As the resin solution, it is possible to use a solution in which the elastic polymer is dissolved in a solvent, an emulsion in which the elastic polymer is emulsified and dispersed, and a dispersion in which the elastic polymer is dispersed in an aqueous solvent. Specific examples of the third elastic polymer include elastic bodies such as polyurethane, an acrylic resin, an acrylonitrile resin, an olefin resin, and a polyester resin. Among these, polyurethane is preferable.

The content ratio of the third elastic polymer applied in the fabric is preferably 0.1 to 60 mass %, more preferably 0.5 to 50 mass %, particularly preferably 1 to 30 mass %, relative to the total amount of the third elastic polymer and the fabric, because a printed napped sheet having well-balanced fullness and suppleness or the like can be obtained. When the content ratio of the elastic polymer is too high, the resulting printed napped sheet tends to be rubber-like and hard.

The elastic polymer may also further contain a colorant such as a pigment, a coagulation regulator, an antioxidant, an ultraviolet absorber, a fluorescent agent, an antifungal agent, a penetrant, an antifoaming agent, a lubricant, a water-repellent agent, an oil-repellent agent, a thickener, a filler, a curing accelerator, a foaming agent, a water-soluble polymer compound such as polyvinyl alcohol or carboxymethyl cellulose, inorganic fine particles, a conductive agent and the like, as long as the effects of the present invention are not impaired.

The fabric has a napped surface. The napped surface can be formed by buffing one surface of the fabric using sandpaper or emery paper with a grit number of preferably about 120 to 600, more preferably about 320 to 600.

Preferably, an elastic polymer (first elastic polymer) is attached to the napped surface in order to make the napped fibers less likely to be raised by friction. By fixing the fibers by attaching the elastic polymer to the napped surface, the fibers are less likely to be raised above a certain height from the collapsed state, and a napped surface with a low surface roughness can be more easily formed. Examples of the method for attaching the first elastic polymer to the napped surface include a method in which a resin solution containing the first elastic polymer is applied to the napped surface, and thereafter dried, thus fixing the elastic polymer to the fibers napped on the napped surface. By fixing the elastic polymer to the fibers present on the napped surface in this manner, the napped fibers present on the napped surface are restrained, and thus are less likely to be raised by friction.

The first elastic polymer that are attached to the napped surface may be the same as the third elastic polymer applied in the fabric, or may be different from the third elastic polymer in type, molecular weight, or the like. However, polyurethane is particularly preferable because it can be easily fixed to the fibers. Examples of the method for applying the resin solution containing the first elastic polymer, used for attaching the elastic polymer to the napped surface, include gravure coating, bar coating, knife coating, roll coating, comma coating, and spray coating. As the resin solution, it is possible to use a solution in which the elastic polymer is dissolved in a solvent, an emulsion in which the elastic polymer is emulsified and dispersed, and a dispersion in which the elastic polymer is dispersed in an aqueous solvent. After applying the resin solution to the napped surface, the elastic polymer may be dissolved in a solvent so as to have enhanced permeability in order to further increase the adhesiveness to the fibers.

The content ratio (solid content) of the first elastic polymer that is attached to the napped surface is preferably 1 to 10 g/m$^2$, more preferably 2 to 8 g/m$^2$, because the fibers can be firmly fixed to the napped surface without making the napped surface too hard.

Preferably, the napped surface of the printed napped sheet according to the present embodiment is further adjusted by the following treatment. For example, by shortening the fibers that are napped on the surface, it is possible to suppress the appearance change caused by the fibers moving in a random direction when the napped surface is rubbed. In order to shorten the fibers that are napped on the napped surface, it is preferable to use fibers that are appropriately cut by napping through buffing, so that the napped fibers can be easily shortened.

In order for the fibers on the napped surface to be easily appropriately cut by buffing, it is preferable to adjust the tenacity and the level of rigidity of the fibers that form the fabric. Specifically, for example, it is preferable that the yarn toughness serving as an index indicating the tenacity and the level of rigidity per one fiber is adjusted to preferably 8 to 40 cN %, more preferably 10 to 30 cN %, on the average. When the yarn toughness is in such a range, the fibers will not become too hard, and, therefore, the fibers that have been fixed in a collapsed state are less likely to be raised. The yarn toughness is a tensile toughness per one fiber, and can be calculated as described below. When the yarn toughness is too high, the fibers on the napped surface tend to be longer, and the surface roughness tends to be higher.

It is also possible to prevent the fibers on the napped surface from being raised above a certain height by applying heat to the napped surface so as to thermally set the fibers on the napped surface in an appropriately laid-down state. Examples of such thermal setting include a shrinkage processing treatment.

In the shrinkage processing treatment, the fabric having a napped surface is mechanically shrunk in the vertical direction (the advancing direction of the production line, or the orientation direction of the fibers), and is then heat-treated for heat setting, with the fibers being kept shrunk, thereby forming micro-waviness in the fibers in the cross section parallel to the vertical direction, which is the orientation direction of the fibers. Examples of the shrinkage processing treatment include a method in which the fabric having a napped surface is brought into close contact with a thick elastic sheet (e.g., a rubber sheet or felt) with a thickness of several centimeters on a surface thereof that has been extended in the vertical direction, and the surface of the elastic sheet is elastically recovered from the extended state to the state before being extended, thereby shrinking the fabric having a napped surface in the vertical direction.

The fabric having a napped surface may be subjected to a flexibilizing treatment by crumpling to adjust the napped surface, or a finishing treatment such as a reverse seal brushing treatment, an antifouling treatment, a hydrophilization treatment, a lubricant treatment, a softener treatment, an antioxidant treatment, an ultraviolet absorber treatment, a fluorescent agent treatment and a flame retardant treatment.

For the fabric having a napped surface, it is preferable that an elastic polymer (second elastic polymer) is further applied to the napped fabric, because the movement of the napped fibers present on the napped surface is restrained, so that the fibers are even less likely to be raised. Preferably, the second elastic polymer is impregnated in the same manner as the third elastic polymer applied to the fabric having a napped surface.

Also, the second elastic polymer that is applied to the napped fabric may be the same as the first elastic polymer and the third elastic polymer described above, or may be different from the first elastic polymer and the third elastic polymer in type, molecular weight, or the like. However, polyurethane is particularly preferable because it can be easily fixed to the fibers. The content ratio of the second elastic polymer that is applied to the napped fabric is preferably 0.1 to 1 mass %, more preferably 0.2 to 0.7 mass %, particularly preferably 0.3 to 0.5 mass %, relative to the total amount of the second elastic polymer and the fabric.

It is preferable that the fabric having a napped surface is colored with a pigment applied into internal voids thereof, because the fabric can be adjusted such that any spot generated when the fibers on the napped surface are erected can be made less conspicuous. Preferably, such a pigment is fixed to the fibers using the above-described first elastic polymer, second elastic polymer, or third elastic polymer as a binder. Although the type of the pigment is not particularly limited, specific examples thereof include white pigments such as zinc white, white lead, lithopone, titanium dioxide, precipitated barium sulfate, and barytes powder, red pigments such as minimum and red iron oxide red, yellow pigments such as chrome yellow and zinc yellow (zinc yellow type 1, zinc yellow type 2), blue pigments such as ultramarine blue and Prussian blue (ferric potassium ferrocyanide), black pigments such as carbon black, and organic pigments, including, condensed polycyclic organic pigments such as a phthalocyanine-based pigment, an anthraquinone-based pigment, a quinacridone-based pigment, a dioxazine-based pigment, an isoindolinone-based pigment, an isoindoline-based pigment, an indigo-based pigment, a quinophthalone-based pigment, a diketopyrrolopyrrole-based pigment, a perylene-based pigment, and a perinone-based pigment, a benzimidazolone-based pigment, and insoluble azo-based pigments such as a condensed azo-based pigment and an azomethine azo-based pigment. Among these, inorganic pigments are preferable because of the excellent light resistance.

The printing napped sheet according to the present embodiment that is produced in the above-described manner has been adjusted such that the napped surface that is printed has, as measured by a surface roughness measurement in accordance with ISO 25178, an arithmetic mean height (Sa) of 20 μm or less in both a grain direction and a reverse grain direction, and a density of peaks (Spd) having a height of 100 μm or more from a mean height, of 20/432 mm$^2$ or less in both the grain direction and the reverse grain direction.

Here, ISO 25178 (surface roughness measurement) prescribes a method for three-dimensionally measuring a surface state by using a contact or non-contact surface roughness/shape measuring machine. The arithmetic mean height (Sa) represents the mean of absolute values of the height differences of various points with respect to the mean plane of the surface. A density of peaks (Spd) having a height of 100 μm or more from a mean height indicates the number of peaks having a height of 100 μm or more from a mean height, out of the number of peaks per unit area. The grain direction of the napped surface is a direction in which napped fibers collapse and are laid down when the napped surface is ordered with a seal brush, and the reverse grain direction of the napped surface is a direction in which the napped fibers are raised when the napped surface is ordered with a seal brush.

The napped surface of the printing napped sheet has been adjusted so as to have an arithmetic mean height (Sa) of 20 μm or less in both a grain direction and a reverse grain direction, and a density of peaks (Spd) having a height of 100 μm or more from a mean height, of 20/432 mm$^2$ or less in both the grain direction and the reverse grain direction. Since the napped surface has such a surface state, the fibers are less likely to freely move beyond a certain range no matter what direction the napped surface is rubbed. As a result, the fibers are less likely to be raised above a certain height from the collapsed state even if the napped surface is rubbed in any of the grain direction and the reverse grain direction. Accordingly, the portion that was shadowed and thus was not colored with an ink during printing is less likely to appear even if the printed surface is rubbed.

The arithmetic mean height (Sa) of the napped surface is 20 μm or less, preferably 15 μm or less, in both the grain direction and the reverse grain direction. When the arithmetic mean height (Sa) exceeds 20 m in one of the grain direction and the reverse grain direction, the fiber surface that was shadowed and thus was not colored with an ink during printing is likely to appear as a result of the printed surface being rubbed.

The density of peaks (Spd) having a height of 100 μm or more from a mean height of the napped surface of the printing napped sheet is the number of, 20/432 mm$^2$ or less, preferably 10/432 mm$^2$ or less, more preferably 5/432 mm$^2$ or less, in both the grain direction and the reverse grain direction. When the density of peaks (Spd) exceeds 20/432 mm$^2$ in one of the grain direction and the reverse grain direction, the portion that was shadowed and thus was not colored with an ink during printing is likely to appear when the printed surface is rubbed.

Furthermore, the density of peaks (Spd) of the napped surface of the printing napped sheet is such that the difference in density of peaks (Spd) between the grain direction and the reverse grain direction, as an absolute value, is preferably 10/432 mm$^2$ or less, more preferably 7/432 mm$^2$ or less, particularly preferably 5/432 mm$^2$ or less. When the absolute value of the difference in density of peaks (Spd) between the grain direction and the reverse grain direction is too large, the portion that was shadowed and thus was not colored with an ink during printing is likely to slightly appear when the printed surface is rubbed.

The printed napped sheet of the present embodiment can be produced by printing the napped surface of the printing napped sheet described above. The method for printing is not particularly limited, and it is possible to use inkjet printing, sublimation transfer inkjet printing, screen printing, or the like without any particular limitation.

The ink used for printing can be prepared by mixing colorants. Although the colorant contained in the ink may be a dye or a pigment, a dye is particularly preferable.

As the dye, various dyes such as a disperse dye, a cationic dye, an acid dye, and a direct dye can be selected according to the type of the fibers that form the fabric. For example, when the fabric includes polyester fibers, it is preferable to use a disperse dye and a cationic dye because of their excellent color development and light resistance. Specific examples of the disperse dye include benzene azo-based dyes (e.g., monoazo and disazo), heterocyclic azo-based dyes (e.g., thiazole azo, benzothiazole azo, quinoline azo, pyridine azo, imidazole azo, and thiophene azo), anthraquinone-based dyes, and condensate-based dyes (e.g., quinophthalone, styryl, and coumarin). These are commercially available as dyes with the prefix "Disperse", for example. Although these may be used alone, two or more dyes are usually used in combination in order to form a pattern.

Note that, after printing, it is preferable to perform a washing treatment in order to wash out any dye that has not been deposited on the fibers. For example, when a polyurethane is applied in the fabric including polyester fibers, the dye is deposited on the polyester fibers, but not on the polyurethane. Therefore, color fastness is reduced unless the disperse dye exhausted onto the polyurethane is washed out. Accordingly, for example, when printing is performed using an ink containing a disperse dye, it is preferable to perform reductive cleaning.

Preferably, reductive cleaning is performed for 30 to 60 minutes in a hot water bath at about 70 to 95° C. in which, for example, an alkaline substance such as caustic soda, a reducing agent such as hydrosulfite or thiourea dioxide, and a surfactant are dissolved. The washing may be performed once, but may be performed two or more times according to the level of the color fastness. After reductive cleaning, an oxidation treatment is usually performed. The method for the oxidation treatment is not particularly limited, and methods using air, an oxygen gas, or an oxidizing agent can be used without any particular limitation. If necessary, a neutralization treatment may be performed, and a soaping treatment may be further performed. Then, drying is performed, whereby a printed napped sheet is finished. If necessary, after drying, a finishing treatment such as a flexibilizing treatment by crumpling, reverse seal brushing, an antifouling treatment, a hydrophilization treatment, a lubricant treatment, a softener treatment, an antioxidant treatment, an ultraviolet absorber treatment, a fluorescent agent treatment, and a flame retardant treatment may be performed.

In this manner, a printed napped sheet having a printed napped surface is obtained. The printed napped surface of the printed napped sheet according to the present embodiment is slightly rougher than the printing napped sheet as a result of undergoing the printing process. Specifically, the napped surface has, as measured by a surface roughness measurement in accordance with ISO 25178, an arithmetic mean height (Sa) of 30 μm or less in both a grain direction and a reverse grain direction, a density of peaks (Spd) having a height of 100 μm or more from a mean height, of 30/432 mm$^2$ or less in both the grain direction and the reverse grain direction, and a difference (absolute value) in density of peaks (Spd) between the grain direction and the reverse grain direction, of 20/432 mm$^2$ or less.

The napped surface of the printed napped sheet has been adjusted so as to have an arithmetic mean height (Sa) of 30 μm or less in both the grain direction and the reverse grain direction, and a density of peaks (Spd) having a height of 100 μm or more from a mean height, of 30/432 mm$^2$ or less in both the grain direction and the reverse grain direction. Since the napped surface has such a surface state, the fibers are less likely to freely move beyond a certain range no matter what direction the napped surface is rubbed. As a result, the fibers are less likely to be raised above a certain height from the collapsed state even if the printed surface is rubbed in any of the grain direction and the reverse grain direction. Accordingly, the portion that was shadowed and thus was not colored with an ink during printing is less likely to appear even if the printed surface is rubbed.

The arithmetic mean height (Sa) of the napped surface is 30 μm or less, preferably 28 μm or less, more preferably 26 μm or less, most preferably 24 μm or less, in both the grain direction and the reverse grain direction. When the arithmetic mean height (Sa) exceeds 30 μm in one of the grain direction and the reverse grain direction, the length of the fibers that freely move is increased as a result of the napped surface being rubbed. As a result, the portion that was shadowed and thus was not colored with an ink during printing is likely to appear when the printed surface is rubbed.

The density of peaks (Spd) having a height of 100 μm or more from a mean height of the napped surface of the printed napped sheet is the number of, 30/432 mm² or less, preferably 20/432 mm² or less, more preferably 18/432 mm² or less, in both the grain direction and the reverse grain direction. When the density of peaks (Spd) exceeds 30/432 mm² in one of the grain direction and the reverse grain direction, the portion that was shadowed and thus was not colored with an ink during printing is likely to appear when the printed surface is rubbed.

Furthermore, the above-described density of peaks (Spd) is such that the difference in density of peaks (Spd) between the grain direction and the reverse grain direction, as an absolute value, is preferably 20/432 mm² or less, more preferably 18/432 mm² or less, particularly preferably 16/432 mm² or less. When the difference in density of peaks (Spd) between the grain direction and the reverse grain direction, as an absolute value, exceeds 20/432 mm², the portion that was shadowed and thus was not colored with an ink during printing is likely to slightly appear when the printed surface is rubbed.

The printed napped sheet obtained in this manner can also be used for production of a decorative molded body that is formed so as to be stacked on and integrated with the surface of a resin molded body such as a housing and a cover of various devices, in addition to being used as a general skin material for clothing, shoes, general merchandise, balls, interior finishing materials, and the like.

EXAMPLES

Hereinafter, the present invention will be described more specifically by way of examples. It should be appreciated that the scope of the present invention is by no means limited by the examples.

Example 1

Ethylene-modified polyvinyl alcohol (PVA) as a thermoplastic resin serving as a sea component and a modified PET that had been isophthalic acid-modified (content ratio of isophthalic acid unit: 6 mol %) as a thermoplastic resin serving as an island component were molten separately. Then, island-in-the-sea composite filaments having an average fineness of 4.8 dtex for forming a cross section on which 12 island component portions having uniform cross-sectional areas were distributed in the sea component were spun. Then, a web of island-in-the-sea composite filaments having a basis weight of about 54 g/m² was produced.

Then, 12 layers of the web were stacked, which was then needle-punched to achieve entanglement, whereby a web entangled sheet having a basis weight of 795 g/m² was obtained. The web entangled sheet was subjected to a steam treatment under the conditions of 110° C. and 23.5% RH, and dried in an oven at 90 to 110° C. Thereafter, the web entangled sheet was further subjected to hot pressing at 115° C., thereby obtaining a heat-shrunk web entangled sheet having a basis weight of 1382 g/m², an apparent density of 0.682 g/cm³, and a thickness of 2.03 mm.

Then, the heat-shrunk web entangled sheet was impregnated with a polyurethane emulsion, and dried, thus applying 13% of the polyurethane (third elastic polymer) relative to the mass of the formed ultrafine fibers. Then, the web entangled sheet was dried, and thereafter immersed in hot water at 95° C. for 10 minutes, while being subjected to nipping and high-pressure water jetting, thus removing PVA by dissolution, and then the sheet was dried. In this manner, an artificial leather gray fabric, which was a fabric of a leather-like sheet, including ultrafine fibers with a design value of a single fiber fineness of 0.30 dtex, and having a basis weight of 1097 g/m², an apparent density of 0.572 g/cm³, and a thickness of 1.92 mm, was obtained.

Then, the artificial leather gray fabric was sliced into two pieces with a uniform thickness, both sides of each of the sliced pieces were ground under the conditions of a speed of 3 m/min and a rotation rate of 650 rpm, using a paper with a grit number of 120 for the back surface and papers with grit numbers of 240, 320, and 600 for the main surface, thus obtaining an artificial leather gray fabric having a napped surface with a basis weight of 391 g/m², an apparent density of 0.536 g/cm³, and a thickness of 0.73 mm.

Then, a solution with a solid content of 7 mass % in which a polyurethane was dissolved in DMF was applied by gravure coating to the napped surface, which was the main surface of the artificial leather gray fabric having a napped surface, and dried. Further, a liquid of DMF/cyclohexanone=10/90 was applied to the main surface, and dried, thus attaching the polyurethane (first elastic polymer) to the napped ultrafine fibers on the napped surface. Note that the polyurethane was applied to the napped surface at a ratio of 2 g/m².

Next, the artificial leather gray fabric having a napped surface was impregnated with a polyurethane emulsion in which carbon black was dispersed as a pigment, and dried, thus applying 0.4 mass % of the polyurethane (second elastic polymer) relative to the mass of the ultrafine fibers. Thus, the artificial leather gray fabric having a napped surface was colored in pale gray.

Then, a flame retardant treatment was performed on the back surface of the artificial leather gray fabric having a napped surface, followed by a shrinkage processing treatment. Specifically, using a shrinkage processing apparatus (sanforizing machine manufactured by Komatsubara Tekko K.K.) including a humidifying portion, a shrinking portion for shrinking the fabric continuously sent from the humidifying portion, and a heat setting portion for heat-setting the fabric that had been shrunk by the shrinking portion, the treatment was performed at a temperature of the shrinking portion of 120° C., a drum temperature of the heat setting portion of 120° C., and a transport speed of 10 m/min. In this manner, a printing napped sheet that was a suede-like artificial leather having a napped surface with an ultrafine fiber fineness of 0.323 dtex, a basis weight of 480 g/m², an apparent density of 0.536 g/cm³, and a thickness of 0.84 mm was obtained. The yarn toughness, which was a tensile toughness per one ultrafine fiber that formed the non-woven fabric included in the printing napped sheet, was 22.9 cN %. Note that the yarn toughness was measured and calculated as follows.

11

[Yarn Toughness Measurement]

A plurality of island-in-the-sea composite filaments that had been spun were attached with cellophane adhesive tape to the surface of a polyester film in a state in which the filaments were slightly loosened. Then, the sea component was removed by extraction by immersing the island-in-the-sea composite filaments in hot water at 95° C. for 30 minutes or more, thereby obtaining ultrafine filaments. Next, the polyester film to which the ultrafine filaments had been fixed was dyed with a disperse dye using a Pot dyeing machine at 120° C. for 20 minuets, to obtain dyed yarns. Then, the elongation was measured with an autograph while a bundle of the fibers corresponding to a single island-in-the-sea composite filament from among the dyed yarns were kept bound, and the elongation of the fiber bundle was measured with the autograph. Then, the breaking strength and the breaking elongation were read from the peak top of the obtained SS curve. Then, the yarn toughness was calculated from the equation: Dyed yarn toughness (cN %)=Breaking strength (cN)×Breaking elongation (%)/Number of ultrafine fibers.

Then, for the obtained printing napped sheet, the surface state of the napped surface was measured according to the following evaluation method.

[Measurement of Surface State of Napped Surface]

The surface state of the napped surface of the printing napped sheet was measured in accordance with ISO 25178 (surface roughness measurement), using "One-Shot 3D Measuring Macroscope VR-3200" (manufactured by KEYENCE CORPORATION), which was a non-contact surface roughness/shape tester. Specifically, the napped surface of the napped sheet was ordered with a seal brush in each of the grain direction and the reverse grain direction. Then, for a range of 18 mm×24 mm of the ordered napped surface, distorted fringe images were captured using a 4 mega-pixel monochrome C-MOS camera at a magnification of 12× under structured illumination light emitted from a high-intensity LED, and the arithmetic mean height (Sa) and the density of peaks (Spd) having a height of 100 μm or more from a mean height in each of the directions were determined. Here, the direction in which the napped fibers collapsed was the grain direction, and the direction in which they rose was the reverse grain direction. The measurement was carried out three times, and the average values thereof were used as the numerical values.

Then, the napped surface of the printing napped sheet was printed. Specifically, using a sublimation transfer inkjet printer, a floral design including colors of black, red, blue, and yellow was printed with a disperse dye ink on the napped surface. Then, the printed printing napped sheet was subjected to reductive cleaning, an oxidation treatment, and a neutralization treatment, followed by drying, to obtain a printed napped sheet. Then, spot-like defects generated when rubbing the floral design printed on the printed napped sheet were evaluated by the following method.

[Evaluation of Generation of Spot-like Defects]

The state of the printed napped surface of the printed napped sheet when the napped surface was ordered in the grain direction and the reverse grain direction using a nylon lint brush was determined according to the following criteria.

A: White spots were not visually conspicuous in each of the grain direction and the reverse grain direction.

B: A few extremely small white spots were observed in one of the grain direction and the reverse grain direction.

C: Large conspicuous white spots appeared in one of the grain direction and the reverse grain direction.

In addition, the surface state of the napped surface after being printed was also measured. The results are shown in Table 1.

TABLE 1

| Example No. | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|---|
| Average fineness (dtex) | 0.323 | 0.255 | 0.206 | 0.121 | 0.095 | 0.121 | 0.323 | 0.323 | 0.255 | 0.255 | 0.323 | 0.323 |
| Yarn toughness (cN·%) | 22.9 | 18.5 | 22.1 | 14.3 | 13.5 | 14.3 | 22.1 | 22.1 | 18.5 | 18.5 | 22.1 | 22.1 |
| Shrinkage processing | Yes | Yes | Yes | Yes | Yes | Yes | Yes | No | Yes | No | Yes | Yes |
| First elastic polymer (g/m²) | 2 | 2 | 2 | 2 | 2 | 3 (Em) | 0 | 0 | 0 | 0 | 2 | 0 |
| Second elastic polymer (mass %) | 0.4 | 0.4 | 0.4 | 0.4 | 0.4 | 0.4 | 0 | 0 | 0 | 0 | 0 | 0.4 |
| Needle density (punch/cm²) | 4189 | 4189 | 4277 | 3745 | 3745 | 3745 | 4189 | 4189 | 4189 | 4189 | 4189 | 4189 |
| Basis weight (g/m²) | 450 | 463 | 270 | 465 | 443 | 461 | 445 | 389 | 434 | 389 | 448 | 446 |
| Thickness (mm) | 0.84 | 0.84 | 0.49 | 0.83 | 0.82 | 0.84 | 0.84 | 0.80 | 0.82 | 0.79 | 0.84 | 0.84 |
| Apparent density (g/cm³) | 0.536 | 0.551 | 0.551 | 0.560 | 0.540 | 0.549 | 0.528 | 0.486 | 0.528 | 0.492 | 0.533 | 0.531 |
| Surface state of printing napped sheet | | | | | | | | | | | | |
| Arithmetic mean height (Sa) (Grain direction, μm) | 9.23 | 9.12 | 7.81 | 5.98 | 7.21 | 7.45 | 22.23 | 30.86 | 27.21 | 29.50 | 14.59 | 20.94 |
| (Reverse grain direction, μm) | 11.43 | 10.85 | 6.92 | 9.35 | 7.84 | 8.39 | 26.34 | 29.99 | 30.19 | 33.05 | 20.28 | 25.73 |
| (Difference between grain direction and reverse grain direction, μm) | 2.20 | 1.73 | 0.89 | 3.37 | 0.63 | 0.94 | 4.11 | 0.86 | 2.98 | 3.55 | 5.69 | 4.79 |
| Density of peaks (Spd) | | | | | | | | | | | | |

TABLE 1-continued

| Example No. | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 | Com. Ex. 6 |
|---|---|---|---|---|---|---|---|---|---|---|---|---|
| (Grain direction, /432 mm²) | 0.14 | 0 | 0 | 0 | 0 | 2.12 | 5.67 | 39.33 | 39.00 | 36.67 | 4.43 | 5.25 |
| (Reverse grain direction, /432 mm²) | 9.35 | 5.72 | 0 | 6.38 | 0.32 | 4.39 | 27.33 | 41.67 | 40.00 | 61.33 | 22.77 | 25.81 |
| (Difference between grain direction and reverse grain direction, /432 mm²) | 9.21 | 5.72 | 0 | 6.38 | 0.32 | 2.27 | 21.67 | 2.33 | 1.00 | 24.67 | 18.34 | 20.56 |
| Surface state of printed napped sheet | | | | | | | | | | | | |
| Arithmetic mean height (Sa) | | | | | | | | | | | | |
| (Grain direction, μm) | 19.38 | 17.43 | 14.11 | 12.19 | 14.68 | 13.27 | 23.18 | 29.85 | 28.12 | 29.60 | 16.12 | 22.26 |
| (Reverse grain direction, μm) | 20.47 | 23.51 | 14.54 | 20.38 | 15.45 | 15.18 | 29.38 | 31.24 | 31.88 | 34.12 | 25.54 | 27.03 |
| (Difference between grain direction and reverse grain direction, μm) | 1.09 | 6.08 | 0.43 | 8.19 | 0.77 | 1.91 | 6.20 | 1.39 | 3.74 | 4.52 | 9.42 | 4.77 |
| Density of peaks (Spd) | | | | | | | | | | | | |
| (Grain direction, /432 mm²) | 0.45 | 0 | 0 | 0 | 0 | 2.12 | 5.83 | 40.01 | 38.91 | 35.26 | 4.02 | 5.37 |
| (Reverse grain direction, /432 mm²) | 16.12 | 10.78 | 0 | 13.20 | 0.67 | 5.31 | 28.32 | 43.27 | 41.18 | 60.74 | 24.89 | 26.94 |
| (Difference between grain direction and reverse grain direction, /432 mm²) | 15.67 | 10.78 | 0.00 | 13.20 | 0.67 | 3.19 | 22.49 | 3.26 | 2.27 | 25.48 | 20.87 | 21.57 |
| White spots after inkjet printing | B | B | A | B | A | A | C | C | C | C | C | C |

Example 2

A printing napped sheet was obtained and evaluated in the same manner as in Example 1, except that ultrafine fibers having a design value of a single fiber fineness of 0.25 dtex were formed instead of forming the ultrafine fibers having a design value of a single fiber fineness of 0.30 dtex. The results are shown in Table 1.

Example 3

A printing napped sheet was obtained and evaluated in the same manner as in Example 1, except that ultrafine fibers having a design value of a single fiber fineness of 0.20 dtex were formed instead of forming the ultrafine fibers having a design value of a single fiber fineness of 0.30 dtex, and that the superposed body was needle-punched at 4277 punch/cm² instead of being needle-punched at 4189 punch/cm² in the formation of the web entangled sheet. The results are shown in Table 1.

Example 4

A printing napped sheet was obtained and evaluated in the same manner as in Example 1, except that ultrafine fibers having a design value of a single fiber fineness of 0.10 dtex were formed instead of forming the ultrafine fibers having a design value of a single fiber fineness of 0.30 dtex, and that the superposed body was needle-punched at 3745 punch/cm² instead of being needle-punched at 4189 punch/cm² in the formation of the web entangled sheet. The results are shown in Table 1.

Example 5

A printing napped sheet was obtained and evaluated in the same manner as in Example 1, except that ultrafine fibers having a design value of a single fiber fineness of 0.08 dtex were formed instead of forming the ultrafine fibers having a design value of a single fiber fineness of 0.30 dtex, and that the superposed body was needle-punched at 3745 punch/cm² instead of being needle-punched at 4189 punch/cm² in the formation of the web entangled sheet. The results are shown in Table 1.

Example 6

A printing napped sheet was obtained and evaluated in the same manner as in Example 4, except that a polyurethane emulsion was applied instead of applying the polyurethane solution in the step of applying the first elastic polymer. The results are shown in Table 1.

Comparative Example 1

A printing napped sheet was obtained and evaluated in the same manner as in Example 1, except that the steps of applying the first and second elastic polymers were omitted. The results are shown in Table 1.

Comparative Example 2

A printing napped sheet was obtained and evaluated in the same manner as in Example 1, except that the steps of applying the first and second elastic polymers were omitted, and that the step of performing the flame retardancy treatment on the back surface of the artificial leather gray fabric having a napped surface and the shrinkage processing treatment was further omitted. The results are shown in Table 1.

Comparative Example 3

A printing napped sheet was obtained and evaluated in the same manner as in Example 2, except that the steps of applying the first and second elastic polymers were omitted. The results are shown in Table 1.

Comparative Example 4

A printing napped sheet was obtained and evaluated in the same manner as in Example 2, except that the steps of applying the first and second elastic polymers were omitted, and that the step of performing the flame retardancy treatment on the back surface of the printing napped sheet and the shrinkage processing treatment was further omitted. The results are shown in Table 1.

Comparative Example 5

A printing napped sheet was obtained and evaluated in the same manner as in Example 1, except that only the step of applying the first elastic polymer was performed, and the step of applying the second elastic polymer was omitted, and that the step of performing the flame retardancy treatment on the back surface of the printing napped sheet and the shrinkage processing treatment was further omitted. The results are shown in Table 1.

Comparative Example 6

A printing napped sheet was obtained and evaluated in the same manner as in Example 1, except that only the step of applying the first elastic polymer was omitted, and only the step of applying the second elastic polymer was performed, and that the step of performing the flame retardancy treatment on the back surface of the printing napped sheet and the shrinkage processing treatment was further omitted. The results are shown in Table 1.

Referring to the results shown in Table 1, all of the printed napped sheets in Examples 1 to 6, which were obtained by printing the printing napped sheets having an Sa of 20 µm or less and an Spd of 20/432 mm$^2$ or less in both the grain direction and the reverse grain direction, and had an Sa of 30 µm or less, an Spd of 30/432 mm$^2$ or less in both of the directions, and a difference in Spd between the grain direction and the reverse grain direction, of 20/432 mm$^2$ or less, were less likely to generate white spots. On the other hand, all of the printed napped sheets in Comparative Examples 1 to 4, which were obtained by printing the printing napped sheets having an Sa exceeding 20 µm or an Spd exceeding 20/432 mm$^2$ in one of the directions, had an Sa exceeding 20 µm or an Spd exceeding 20/432 mm$^2$ in one of the directions, or had a difference in Spd between the grain direction and the reverse grain direction exceeding 20/432 mm$^2$. Also, large white spots were generated in all of the obtained printed napped sheets.

INDUSTRIAL APPLICABILITY

A printing napped sheet obtained according to the present invention can be preferably used as a skin material for clothing, shoes, articles of furniture, car seats, general merchandise, and the like.

The invention claimed is:

1. A printed napped sheet, comprising:
a fabric having a napped surface formed by napped fibers having an average fineness of 0.01 to 0.5 dtex,
wherein:
the fabric includes a first elastic polymer and a second elastic polymer;
the first elastic polymer is attached to and restrains the napped fibers;
the second elastic polymer is the same as or different from the first elastic polymer and is impregnated into the fabric after attaching the first elastic polymer;
a content of the first elastic polymer is 1 to 10 g/m$^2$;
the napped surface has a design applied by printing on the napped fibers; and
the napped surface has, as measured by a surface roughness measurement in accordance with ISO 25178,
an arithmetic mean height (Sa) of 30 µm or less in both a grain direction and a reverse grain direction,
a density of peaks (Spd) having a height of 100 µm or more greater than the arithmetic mean height (Sa) of 30/432 mm$^2$ or less in both the grain direction and the reverse grain direction, and
an absolute value of a difference between the density of peaks (Spd) in the grain direction and the density of peaks (Spd) in the reverse grain direction of 20/432 mm$^2$ or less.

2. The printed napped sheet according to claim 1, wherein the napped fibers have an average yarn toughness of 8 to 40 cN·%.

3. The printed napped sheet according to claim 1, wherein:
the napped fibers include polyester fibers; and
the printing is performed with a disperse dye ink.

4. The printed napped sheet according to claim 1, wherein the fabric is a leather-like sheet including a third elastic polymer applied therein.

5. The printed napped sheet according to claim 1, wherein the fabric is colored with a pigment applied into internal voids thereof.

6. A printed napped sheet, comprising:
a fabric having a napped surface formed by napped fibers having an average yarn toughness of 8 to 40 cN·%,
wherein:
the fabric includes a first elastic polymer and a second elastic polymer;
the first elastic polymer is attached to and restrains the napped fibers;
the second elastic polymer is the same as or different from the first elastic polymer and is impregnated into the fabric after attaching the first elastic polymer;
a content of the first elastic polymer is 1 to 10 g/m$^2$,
the napped surface has a design applied by printing on the napped fibers; and
the napped surface has, as measured by a surface roughness measurement in accordance with ISO 25178,
an arithmetic mean height (Sa) of 30 µm or less in both a grain direction and a reverse grain direction,
a density of peaks (Spd) having a height of 100 µm or more greater than the arithmetic mean height (Sa) of 30/432 mm$^2$ or less in both the grain direction and the reverse grain direction, and
an absolute value of a difference between the density of peaks (Spd) in the grain direction and the density of peaks (Spd) in the reverse grain direction of 20/432 mm$^2$ or less.

7. The printed napped sheet according to claim 6, wherein:

the fibers include polyester fibers having an average fineness of 0.01 to 0.5 dtex; and the printing is performed with a disperse dye ink.

8. The printed napped sheet according to claim 6, wherein the fabric is a leather-like sheet.

9. The printed napped sheet according to claim 6, wherein the fabric is colored with a pigment applied into internal voids thereof.

* * * * *